Dec. 8, 1964    A. MADWED    3,159,950
VIBRATING MACHINE
Filed May 7, 1962    3 Sheets-Sheet 1
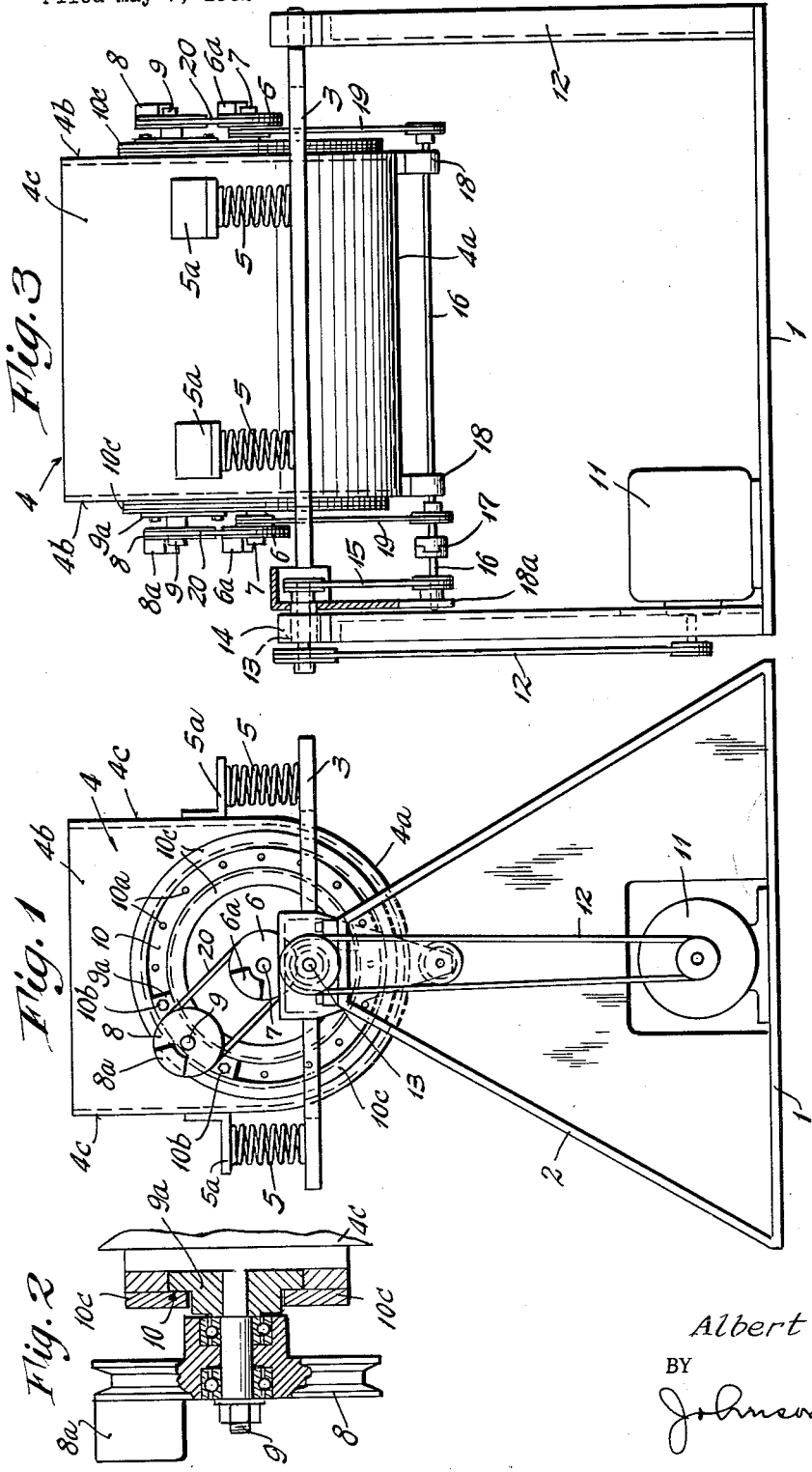
INVENTOR.
Albert Madwed
BY
Johnson and Kline
ATTORNEYS Dec. 8, 1964 A. MADWED 3,159,950
VIBRATING MACHINE
Filed May 7, 1962 3 Sheets-Sheet 2
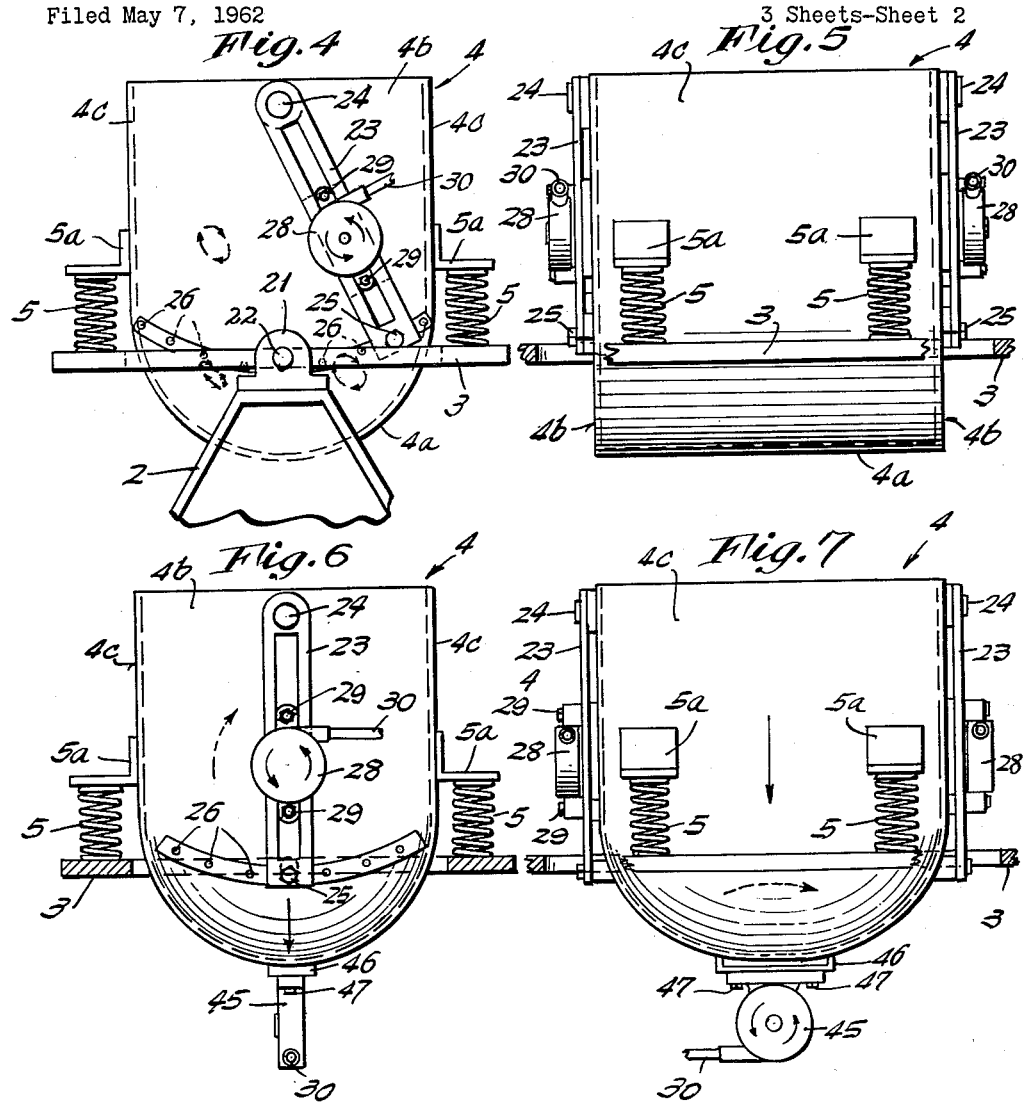
INVENTOR.
Albert Madwed
BY
Johnson and Kline
ATTORNEYS

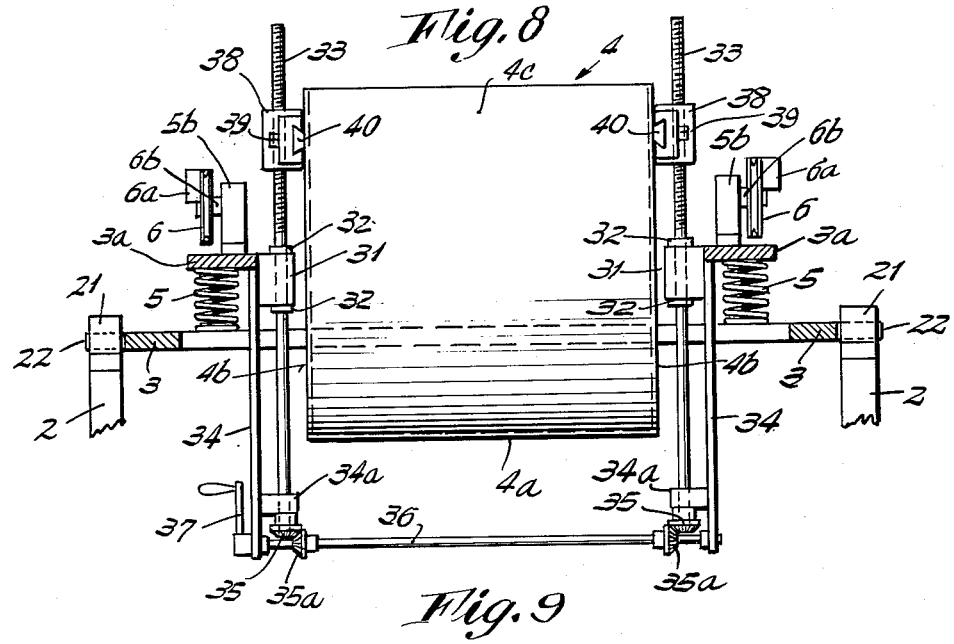
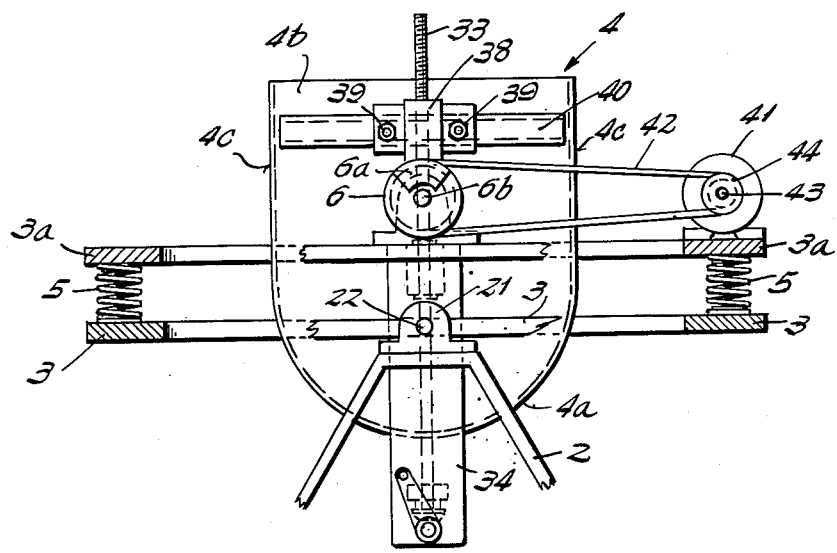

United States Patent Office 3,159,950
Patented Dec. 8, 1964

3,159,950
VIBRATING MACHINE
Albert Madwed, 261 River St., Bridgeport, Conn.
Filed May 7, 1962, Ser. No. 192,818
8 Claims. (Cl. 51—163)

This invention relates to vibrating machines, and more particularly to vibrating machines having an adjustable axis of vibration.

Vibrating machines are in widespread use for the precision treatment of metallic, plastic or wooden workpieces which, after being cast, molded, machined or carved, are left with slight imperfections. The receptacle or barrel of the machine contains suitable aggregate compound such as metal balls, pellets or the like abrasive particulate matter and/or fibrous polishing materials such as sawdust, wood-chips, corncobs or the like. A batch of the parts to be treated, such as finished, cleaned, descaled, deburred or the like, is inserted into the barrel and more or less float in the aggregate as the barrel is agitated. The machine is activated by vibration-producing means such as rotating eccentric or reciprocating weights, pneumatically or otherwise operated to cause the workpieces to travel through the compound and thereby be subjected to surface treatment by rubbing or striking contact with the aggregates.

With known vibrating machines it is possible to vary the amplitude and frequency of the vibrations and in this way control to some extent the motion or path of the workpieces traveling through the compound. However the workpieces generally tend to settle more or less in a group or cluster towards the axis of vibration of the machine and this settling may be varied somewhat, depending on the weight and size of the workpieces, by varying the amplitude of the vibrations. Although this helps to some extent in causing the workpieces to travel more uniformly through the compound, it is not sufficiently effective since the majority of the workpieces still tend to travel in a location close to the axis of vibration thereby making undesirable contact with each other frequently with resultant damage thereto.

Also with known vibrating machines the workpieces tend to remain in the same general vertical plane where inserted. The workpieces travel through the aggregate but since the only vibrating force is in a vertical direction, the workpieces are not caused to travel horizontally. This is detrimental in that the workpieces are generally inserted as a batch into the top of the barrel and fall in the same general location therein. Under vertical vibration the workpieces travel in the same general vertical plane rather than being horizontally dispersed in the aggregate, so that contact and damage are more frequent and the total amount of aggregate compound is not being effectively utilized.

It is an object of the present invention to provide a vibrating machine having an adjustable axis of vibration which may be shifted in simple and convenient manner to accommodate the weight and size of the workpieces to be precision treated.

It is another object of this invention to provide a vibrating machine having two axes of vibration, one of which may be fixed, and having another adjustable axis of vibration in a plane substantially perpendicular to the other axis of vibration so as to impart both vertical and horizontal travel to the workpieces in the barrel.

It is another object of this invention to provide a vibrating machine in which the axis of vibration may be adjusted by varying the position of the vibration inducers relative to the position of the barrel which is non-adjustable.

It is still another object of this invention to provide a vibrating machine in which the axis of vibration may be adjusted by varying the position of the barrel relative to the position of the vibration inducers which is non-adjustable.

These and other objects and advantages are accomplished as more fully set out herein and in the accompanying drawings, in which:

FIGURE 1 is an end view of a vibrating machine according to one embodiment of the present invention in which the position of the vibration inducers is adjustable relative to the position of the barrel which is non-adjustable.

FIG. 2 is an enlarged view of the movable eccentric weight shown in FIG. 1.

FIG. 3 is a front view of the machine shown in FIG. 1.

FIG. 4 is a side view of a vibrating machine according to another embodiment of the present invention in which pneumatic vibration inducers are adjustably mounted at opposite sides of the barrel.

FIG. 5 is a front view of the machine of FIG. 4.

FIG. 6 is a side view of a vibrating machine according to another embodiment of the present invention in which vibration inducers are adjustably mounted at opposite sides of the barrel to impart vertical vibration to the barrel while another vibration inducer is located in fixed position at the bottom of the barrel with its axis in a plane perpendicular to the plane of the adjustable vibration inducers to impart horizontal vibration to the barrel.

FIG. 7 is a front view of the machine of FIG. 6.

FIG. 8 is a front view of a vibrating machine according to another embodiment of the present invention in which the position of the barrel is adjustable relative to the position of vibration inducing means.

FIG. 9 is a side view of the machine of FIG. 6.

Referring more specifically to the drawings, a machine according to one aspect of this invention as illustrated by FIGS. 1 to 3 has a support comprising a base 1 and two sets of supporting legs 2, the legs of each set meeting at the top to provide a support for the platform 3 upon which the receptacle or barrel 4 of the machine is resiliently mounted by springs 5 and brackets 5a mounted on the barrel. The barrel 4 has a semicircular bottom 4a and vertical side walls 4b and front and back walls 4c. The barrel is provided on corresponding areas at each side with a pulley 6 having an eccentric weight 6a. The pulley 6 is located in fixed position in the center of the sides of the barrel and is rotatably mounted on stub shafts 7 secured to the sides of the barrel. Two other pulleys 8 having eccentric weights 8a are rotatably mounted on stub shafts 9 and may be moved in a circle around the axis of the weighted pulleys 6 in track 10 and positioned at any of a plurality of locations depending upon the axis of vibration desired. Weighted pulleys 8 are always positioned at corresponding locations at each side of the barrel. Each shaft 9 is fixed to an arcuate block 9a which is slidable along track 10 and may be moved to any selected location defined by threaded holes 10a where it may be anchored by means of bolts 10b, as shown in FIG. 1. The track 10 is provided on the sides of the barrel by annular flanges 10c mounted thereon.

On the base 3 is mounted motor 11 which drives belt 12 which in turn drives shaft 13. Shaft 13 is rotatably mounted in housing 14 on the supporting legs 2. The rotation of shaft 13 drives belt 15 which turns shaft 16 having thereon a flexible coupling 17 to compensate for the vibration of the machine. The shaft 16 is rotatably mounted on supports 18 attached to the barrel of the machine and 18a attached to the platform 3. The rotation of shaft 16 simultaneously drives belts 19 attached to said eccentrically weighted pulleys 6 which in turn drive the eccentrically weighted pulleys 8 by means of belts 20 connecting the same.

Upon removing the bolts 10b, the movable eccentrically weighted pulleys 8 may be moved to any selected location along track 10 when it is desired to change the axis of vibration of the barrel 4 and in this way to control the relative movement of the aggregate and the workpieces. The latter having more mass than the individual aggregate particles tend to travel in a circular path in the aggregate about the axis of the pulley 6 and in the direction of rotation thereof. However, the tendency is changed by the vibrations emanating from the weighted pulley 8 which changes the axis of vibration.

The actual axis of vibration of the barrel is located in a plane between the vibration pulleys 6 and the vibration pulleys 8. In cases where the vibrating force of the pulleys is identical, the plane of vibration appears to be substantially equidistant between the axes of the pulleys. If heavy workpieces are being treated, the movable weight pulley will be positioned either directly above the stationary eccentric weight pulley or at least in some location on the track on a plane above that of the pulley 6 in order to raise the axis of vibration of the barrel and attract the workpieces in an upward direction and prevent them from congregating at the bottom of the barrel and being damaged by frequent contact with one another. It should be understood, however, that although the major force of the combined weights may draw the workpieces from the bottom of the barrel, the vibration caused is rotary so that the workpieces and compound travel around the axis of vibration in a circular spiral path. The positioning of the movable eccentric weight pulley along the track to shift the axis of vibration depends upon the weight and size of the workpieces and their tendency to congregate in clusters in the compound.

When lightweight workpieces are being treated they may tend to congregate at the top of the barrel on or near the surface of the compound unless the movable eccentric weight pulley is positioned directly below the stationary weight pulley or at least on some location on the track on a plane below that of the stationary weight pulley to lower the axis of vibration and attract the workpieces in a downward direction.

According to another embodiment of this invention, as illustrated by FIGS. 4 and 5, a single vibration inducer of the electromagnetic, pneumatic or electric type is adjustably mounted at corresponding locations on each side of the barrel of the vibrating machine to adjust the axis of vibration of the barrel. In these figures, parts identical to those shown in the preceding figures are given like numbers.

In this embodiment, the legs 2 of the frame support mountings 21 which are provided with openings to rotatably receive shaft 22 which is anchored to the platform 3. The receptacle or barrel 4 is resiliently mounted on the platform by brackets 5a mounted on springs 5 which allow for vibratory movement. To each side of the barrel is attached a movable track 23 for slidably supporting pneumatic vibrator 28 having air hose 30. The top of the track is rotatably mounted on shaft 24 on the barrel, and the bottom of the track may be anchored at any of the positions 26 on the barrel by bolt 25. Likewise the vibrator may be slid vertically up or down the track and anchored at any desired position by bolts 29 which secure the vibrator to the track.

In this way the vibrators may be located at numerous corresponding positions on the sides of the barrel to locate the axis of vibration where desired, depending upon the nature of the work pieces being treated to provide the beneficial results discussed hereinbefore.

According to another embodiment illustrated by FIGS. 8 and 9, the axis of vibration of the vibrating machine may be moved by adjusting the position of the barrel relative to the fixed position of the vibration inducers. In these figures, parts identical to those hereinbefore discussed are given like numbers.

In this embodiment the vibration inducers and drive therefor are mounted on upper platform 3a which is attached to lower platform 3 by springs 5 to allow for vibratory movement. Upper platform 3a carries mountings 5b having thereon shafts 6b on which eccentric weight pulleys 6 are rotatably mounted. The upper platform 3a also has mounted thereon upper bearings 31 which rotatably support shafts 33 together with lower bearings 34a mounted on brackets 34. Associated with bearings 31 are thrust bearings 32 which are secured to the shafts to permit their rotation in the bearings 31 while preventing their lateral movement. The upper portion of the shafts above the upper thrust bearings are threaded and carry threaded barrel supports 38 adapted to screw up and down said threaded shafts. The barrel supports are slidably mounted on barrel support tracks 40 and may be secured in any desired position on said tracks by bolts 39. In this way the barrel is resiliently mounted on the support.

The lower end of shafts 33 have secured thereto bevel gears 35 associated with bevel gears 35a secured to manual shaft 36. The manual shaft is rotatably mounted on the lower end of brackets 34 suspended from upper platform 3a and has secured to one end a handle 37. Turning of the handle effects rotation of horizontal shaft 36 and vertical shafts 33, thereby causing the barrel 4 of the machine to travel vertically on the threaded portion of shafts 33 to lower or raise the barrel as desired. In this way the center of gravity of the barrel may be shifted vertically relative to the location of the stationary eccentric weight vibration inducers so that the axis of vibration relative to the mass in the barrel is also shifted vertically.

For shifting the axis of vibration horizontally relative to the mass, the bolts 39 are loosened on the barrel supports 38 and the latter are slid horizontally across barrel tracks 40 to the desired position and secured in position by bolts 39.

The vibration inducing eccentric weight pulleys 6 are driven by belts 42 mounted on pulleys 44 on shaft 43 energized by motor 41 which is mounted on upper platform 3a.

As may be clearly seen, this embodiment allows the barrel to be moved horizontally and/or vertically while retaining the vibration inducers in secured position. Thus the axis of vibration relative to the mass in the barrel may be shifted to nearly any location on the barrel to accommodate the nature of the workpieces being treated.

According to still another embodiment of this invention, as illustrated by FIGS. 6 and 7 of the drawing, the vibrating machine may be furnished with two separate vibration inducer systems, each of which induces an axis of vibration in a plane perpendicular to the other.

Thus vibration inducers 28 may be adjustably mounted at each side of the barrel on movable track 23 in a manner identical to that as illustrated by FIGS. 4 and 5, like numbers being used to identify parts identical to those shown in FIGS. 4 and 5. These inducers create a vertical axis of vibration in the barrel, causing the compound and workpieces to travel in a vertical path from top to bottom of the barrel.

On the bottom of the barrel, vibration inducer 45 is centered and mounted on brace 46 by bolts 47, and in a plane parallel to that of vibration inducers 28. Vibrator 45 creates a horizontal axis of vibration in the barrel, causing the compound and workpieces to travel in a horizontal path from side to side of the barrel.

The combined effect of the two vibration inducer systems is that the workpieces travel completely and uniformly throughout the aggregate compound and are more completely dispersed therein so as to materially reduce the number of times the workpieces make contact with each other and are damaged.

The adjustability of the top vibrators 28 permits the vertical path of the workpieces to be closely controlled depending upon their size and shape.

As is obvious from the foregoing description and drawings, many variations in the structure of the apparatus of this invention are possible without departing from the scope of the invention.

The size and shape of the receptacle or barrel used according to the present invention may be varied from a fairly shallow pan to a relatively deep vat or the like depending upon the nature of the workpieces being treated. It is preferred that the bottom of the receptacle be rounded on at least two sides, as illustrated by the drawings. It is also contemplated that the receptacle be rounded on all sides so as to have a circular circumference. The receptacle may also be provided with a lid or cover if desired.

There is no particular criticality with respect to the nature of the vibration inducers employed, devices equivalent in effect to the pneumatic and eccentric weight vibrators illustrated being contemplated within the present claims.

Variations and modifications may be made within the scope of the claims and portions of the improvements may be used without others.

I claim:

1. A vibrating machine comprising two sections, one of said sections being a receptacle adapted for receiving particulate material and workpieces and the other of said sections being a support for the receptacle, said receptacle being resiliently mounted; rotary vibration-imparting means; means for mounting said vibration-imparting means for rotation on one of said sections; means for rotating said vibration-imparting means on its axis whereby vibrations are imparted to the receptacle to cause the receptacle to vibrate along a determinate path; and means for adjusting the relative positions of the axis of rotation of the vibration-imparting means and the receptacle to change the path of vibration of the receptacle.

2. A vibrating machine comprising a receptacle adapted for receiving particulate material and workpieces; a support for the receptacle; means for resiliently mounting the receptacle on the support; rotary vibration-imparting means; means for mounting said vibration-imparting means on the receptacle for rotation; means for rotating said vibration-imparting means on its axis whereby vibrations are imparted to the receptacle to cause the receptacle to vibrate along a determinate path; and means for adjusting the position of the axis of rotation of the vibration-imparting means relative to the receptacle to change the path of vibration of the receptacle.
adapted for receiving particulate material 3. A vibrating machine comprising a receptacle adapted for receiving particulate material and work pieces; a support for the receptacle; means for resiliently mounting the receptacle on the support; rotary vibration-imparting means; means for mounting said vibration-imparting means on the support for rotation; means for rotating said vibration-imparting means on its axis whereby vibrations are imparted to the receptacle to cause the receptacle to vibrate along a determinate path; and means for adjusting the position of the receptacle relative to the position of the axis of rotation of the vibration-imparting means to change the path of vibration of the receptacle.

4. A vibrating machine as defined by claim 3 in which the receptacle is movably adjustable in both vertical and horizontal directions.

5. A vibrating machine comprising a receptacle adapted for receiving particulate material and workpieces; a support for the receptacle; means for resiliently mounting the receptacle on the support; a pair of rotary vibration-imparting means; means for mounting said pair of vibration-imparting means at corresponding locations on opposite sides of said receptacle; means for rotating said vibration-imparting means on their axes whereby vibrations are imparted to the receptacle to cause the receptacle to vibrate along a determinate path; and means for adjusting the positions of the axes of rotation of the vibration-imparting means relative to the receptacle to change the path of vibration of the receptacle.

6. A vibrating machine comprising a receptacle adapted for receiving praticulate material and workpieces; a support for the receptacle; means for resiliently mounting the receptacle on the support; two pair of rotary vibration-imparting means; means for mounting said two pair of vibration-imparting means at corresponding locations on opposite sides of said receptacle, one vibration-imparting means from each pair being mounted in fixed position on the receptacle while the other is movably attached to the receptacle; means for rotating said vibration-imparting means on their axes whereby vibrations are imparted to the receptacle to cause the receptacle to vibrate along a determinate path; and means for adjusting the position of the axes of rotation of the movably attached vibration-imparting means relative to the receptacle to change the path of vibration of the receptacle.

7. A vibrating machine comprising a receptacle adapted for receiving particulate material and workpieces; a support for the receptacle; means for resiliently mounting the receptacle on the support; rotary vibration-imparting means comprising movably adjustable vibrating means adapted to vibrate said receptacle along one predetermined path and stationary vibrating means adapted to vibrate said receptacle along another predetermined path substantially perpendicular to the first predetermined path; means for mounting said vibration-imparting means for rotation on said receptacle; means for rotating said vibration-imparting means on their axes whereby vibrations are imparted to the receptacle to cause the receptacle to vibrate along a determinate path; and means for adjusting the position of the axis of rotation of the movably adjustable vibration-imparting means relative to the receptacle to change the path of vibration of the receptacle.

8. A vibrating machine as defined by claim 7 in which the movably adjustable vibrating means comprises two vibration inducing means, each movably mounted at corresponding locations on opposite ends of the receptacle and the stationary vibrating means comprises a single vibration inducing means mounted at the bottom of the receptacle.

References Cited in the file of this patent
UNITED STATES PATENTS
2,997,813   Brandt _____ Aug. 29, 1961

UNITED STATES PATENT OFFICE
CERTIFICATE OF CORRECTION

Patent No. 3,159,950　　　　　　　　　　　　　　December 8, 1964

Albert Madwed

It is hereby certified that error appears in the above numbered patent requiring correction and that the said Letters Patent should read as corrected below.

Column 5, line 48, strike out "adapted for receiving particulate material"; column 6, line 18, for "praticulate" read -- particulate --.

Signed and sealed this 4th day of May 1965.

(SEAL)
Attest:

ERNEST W. SWIDER
Attesting Officer

EDWARD J. BRENNER
Commissioner of Patents